(12) United States Patent
Horwitz et al.

(10) Patent No.: US 7,116,212 B2
(45) Date of Patent: Oct. 3, 2006

(54) SYSTEM FOR MULTI-STANDARD RFID TAGS

(75) Inventors: Clifford A. Horwitz, Thornhill (CA); William E. Davidson, Durham, NC (US)

(73) Assignee: Sirit Technologies Inc., Toronto (CA)

( * ) Notice: Subject to any disclaimer, the term of this patent is extended or adjusted under 35 U.S.C. 154(b) by 160 days.

(21) Appl. No.: 10/644,916

(22) Filed: Aug. 21, 2003

(65) Prior Publication Data

US 2004/0085191 A1    May 6, 2004

Related U.S. Application Data

(63) Continuation of application No. 09/477,478, filed on Jan. 6, 2000, now Pat. No. 6,617,962.

(51) Int. Cl.
*H04Q 5/22*    (2006.01)
*G08C 19/00*   (2006.01)

(52) U.S. Cl. ............... 340/10.1; 340/10.3; 340/825.69

(58) Field of Classification Search ........... 340/10.1, 340/10.3, 10.4, 825.69, 825.7, 825.71, 825.73, 340/988, 572.1, 572.4, 572.5; 455/101
See application file for complete search history.

(56) References Cited

U.S. PATENT DOCUMENTS

| | | | |
|---|---|---|---|
| 4,703,327 A | 10/1987 | Rossetti et al. | |
| 5,347,280 A | 9/1994 | Schuermann | |
| 5,381,137 A | 1/1995 | Ghaem et al. | |
| 5,451,958 A | 9/1995 | Schuermann | |
| 5,519,381 A | 5/1996 | Marsh et al. | |
| 5,543,798 A | 8/1996 | Schuermann | |
| 5,604,486 A * | 2/1997 | Lauro et al. ............... 340/10.3 | |
| 5,684,828 A | 11/1997 | Bolan et al. | |
| 5,914,671 A | 6/1999 | Tuttle | |
| 5,952,935 A | 9/1999 | Mejia et al. | |
| 5,956,654 A | 9/1999 | Deville et al. | |
| 6,023,610 A | 2/2000 | Wood, Jr. | |
| 6,034,603 A | 3/2000 | Steeves | |
| 6,107,910 A | 8/2000 | Nysen | |
| 6,127,928 A | 10/2000 | Issacman et al. | |
| 6,172,609 B1 | 1/2001 | Lu et al. | |
| 6,259,991 B1 | 7/2001 | Nysen | |
| 6,351,215 B1 | 2/2002 | Rodgers et al. | |
| 6,353,406 B1 | 3/2002 | Lanzl et al. | |
| 6,480,143 B1 * | 11/2002 | Kruger et al. ............... 342/44 |
| 6,509,828 B1 | 1/2003 | Bolavage et al. | |

FOREIGN PATENT DOCUMENTS

| | | |
|---|---|---|
| DE | 196 35 311 | 3/1998 |
| EP | 0 282 992 | 3/1988 |
| EP | 0 598 624 | 11/1993 |
| EP | 0 798 675 | 1/1997 |
| GB | 2 305 074 | 8/1995 |
| WO | WO 94/18579 A1 | 8/1994 |
| WO | WO 98/52168 A2 | 11/1998 |

* cited by examiner

*Primary Examiner*—Wendy R. Garber
*Assistant Examiner*—Nam Nguyen
(74) *Attorney, Agent, or Firm*—Haynes and Boone, LLP

(57) ABSTRACT

A reader for a radio frequency identification system capable of simultaneously reading tags operating a multiple frequencies. The reader includes a radio frequency module for each operating frequency of the tags. The radio frequency modules are coupled to a bus which is connected to an interrogator control module. Each of the radio frequency modules receives the return signal from the tags at the associated operating frequency and converts the return signal into a pulse sequence. The interrogator control module locks to and decodes the pulse sequence according to the protocol associated with the tag type.

26 Claims, 3 Drawing Sheets

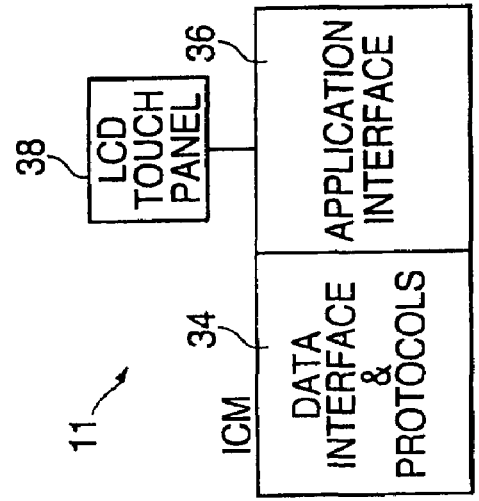
FIG. 2 (PRIOR ART)
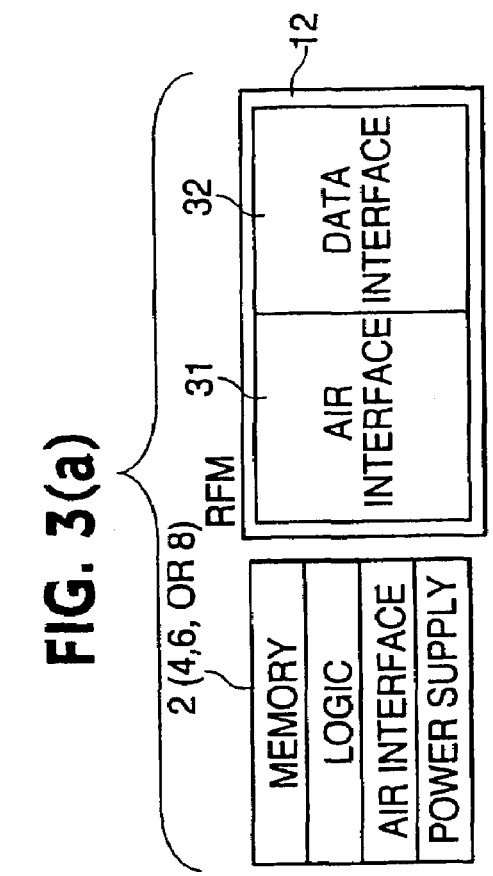
FIG. 3(b)
FIG. 3(a)

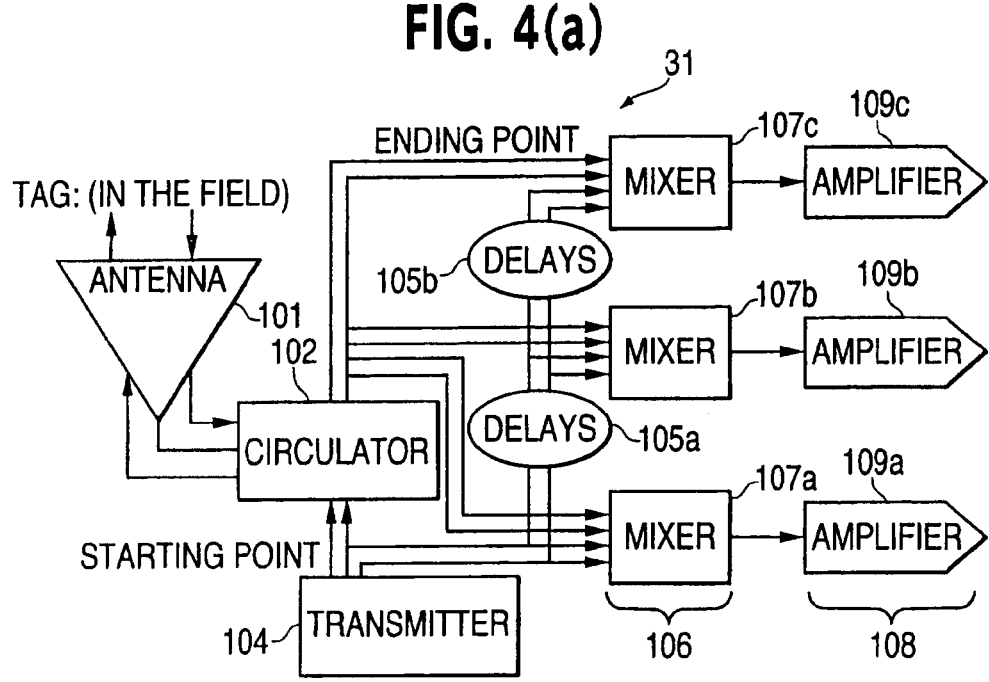
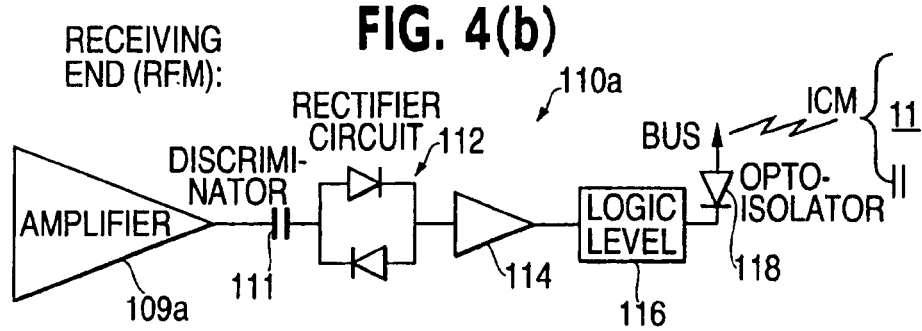

SYSTEM FOR MULTI-STANDARD RFID TAGS

CROSS-REFERENCE TO RELATED APPLICATION(S)

This application is a CON of U.S. patent application Ser. No. 09/477,478, filed on Jan. 06, 2000, which is U.S. Pat. No. 6,617,962.

FIELD OF THE INVENTION

The present invention relates generally to radio frequency identification systems, and more particularly, to a reader for a radio frequency identification system that can operate with different tags at different frequencies using different protocols.

BACKGROUND OF THE INVENTION

In general an RFID tag system allows for objects to be labeled with tags such that when the tag is passed through the electromagnetic field of a reader/interrogator the object can be identified by reading the tag that is attached to the object. In use, RFID tags are attached in a wide variety of methods including being bolted to the item or simply glued to the inside of existing packaging or labeling. They can be encoded with a user-defined data at time of use, or pre-coded at time of tag manufacture numbering system or even a combination of both.

Radio frequency identification systems provide a number of advantages over paper and ink labels, such as bar code systems in that: a much greater degree of automation is permitted; clear line of sight is not required, tags can be obscured by dirt, paper, even other objects or packaging; reading distances can be greater; tags can be hidden either to protect the tag from damage in use or for security reasons; and in the case of read/write tags incremental information can be stored on the tags such as PO#, expiry date, destination, confirmation of an applied process, etc.

Those are just some of the advantages of RFID tags. The tag may be a single integrated circuit chip bonded to a flat, printed antenna, or could be a complex circuit including battery and sensors for temperature, position, orientation or any other required feature.

Specifically there are a great deal of different tag types that can be characterized as having one or more, but not limited to the following properties: passive, having no battery and therefore receiving all of its power required for operation from an electromagnetic field transmitted by the reader/interrogator or active using a self contained battery on the tag; collision arbitration, meaning that more than one tag can be read in the field of a single reader/interrogator at one time or non collision, meaning that only one tag can be in the field of the reader/interrogator at a time in order to insure a good read; multiple frequency where the data from the tag is carried on a different frequency from the data to the tag or single frequency where the carrier in both directions is the same; full duplex, where the tag is transmitting data back to the reader/interrogator while the reader/interrogator's transmitter is active or half duplex where the tag waits for the reader/interrogator's transmitter to go inactive before replying; solicited, where the tag must be commanded by the reader/interrogator before it transmits the data back, or unsolicited, where the tag transmits back as soon as it is powered up; active transmitter, where the tag has its own oscillator and transmitter or back-scatter, where the tag modulates the field set up by the reader/interrogator's transmitter; read only tag, which can be equated to an electronic barcode or read/write tag, which allows for the equivalent of a scratch pad on the tag. In either case tags can have different sizes of data that is transferred, different sizes of write-able memory, different accessing schemes to the data and different methods of writing; carrier frequency, is a function of the application, the physics of the objects being tagged, the range required and the radio frequency spectrum regulations of the country in which it is operating; data rate, is a function of the carrier frequency, the application needs and the radio frequency spectrum regulations of the country in which it is operating; data encoding methods can vary significantly however some form which encodes the data with the clock, such as Manchester encoding is generally used; packet protocol for data transmission from and to the tag has to be defined in terms of headers, addressing, data field types and sizes, commands, functions, handshaking, etc. etc.; error correction or detection codes, can be used by the tags to improve reliability of the tag data transfer, generally a CRC error detection only scheme is used, however the particular CRC code must be specified; additional signaling devices such as beepers or LEDs can be added to the tag to alert and direct the operator to a particular tagged object in the field; additional sensors, such as, for example temperature, can be added to the tag to record extreme conditions that the tagged object has been passing through.

As can be seen from the list above, there is an extremely wide variety of tag types that may be used or required by an application making it very hard to have one reader/interrogator handle all tag types. Typically there would have to be a specific reader/interrogator matched to the specific properties of each type of tag being used in the application.

For example, a typical low cost passive tag system with unsolicited tag response, would be implemented as follows; the reader/interrogator would first activate the tag by generating an electromagnetic field of a given frequency. Such an electromagnetic field can be generated, for example, by applying an alternating electrical current at a given frequency to a coil for low frequency near field systems commonly called inductively coupled systems or to an RF antenna for far field higher frequency systems.

The tag includes an antenna, which could be a dipole for far field systems or a coil for inductive systems tuned to the frequency of the interrogator's generated electromagnetic field. The electrical current thus generated in the tag's antenna is used to power the tag. Data is generally sent to the tag by modulating this interrogator generated electromagnetic field which is commonly called the exciter or illuminating field. The tag can send data back to the interrogator either by transmitting with its own transmitter with a separate frequency and antenna from the illuminating field or by modulating the illuminating field by changing the loading of the tag's antenna in what is commonly called a back scatter system. In any case, either the new electromagnetic field from the tag or the disturbances in the interrogator's illuminating field caused by the tag's back scatter system is detected by the interrogator. The data from the tag is thus decoded, thereby enabling the tag and the item to which the tag is attached to be identified. In some cases written to, as in the case of read/write tags by modulating the interrogator's generated electromagnetic field. Typical information that might be stored on the tags would be: PO#; expiry date; destination; confirmation of an applied process, etc.

The advantages and disadvantages of using different properties for the tag depend so heavily on the type of application that at this point there is no clear winner type of tag that will totally dominate the field. For example, in some cases range is an advantage, in other cases range is a disadvantage. Objects with high moisture or water content are not suitable for tagging with high frequency tags. Applications requiring high data rates or many tags in the field at any one time are not suitable to low frequency tags. Cost of the tag in relationship to the object being tagged and or the re-usability of the tag is a very important constraint in selecting tag properties.

As can be seen even from the few examples shown above, any application will be a compromise of tag properties in order to meet the application's need. In order to maximize the performance and meet the cost goals, the type of tag must be selected to match the application. Even if a single carrier frequency can be selected for an application differences in the other properties of the tag could still necessitate different reader/interrogators for the different tag types. Given that this is the case and that any large application may have different performance goals and therefore tag types, it is extremely advantageous to have a reader/interrogator that is flexible and can read many tag types simultaneously. This might even be mandatory in applications where there are different reader/interrogator types operating at the same carrier frequency and thus interfering with each other. Such a universal reader/interrogator would also solve the other great hurdle in implementing RFID tag systems, and that is the fear of obsolescence and not being able to read the next type of tag that may be required in the application.

In some situations, it is possible for an end user of the radio frequency identification system to include multiple readers, so that different tags using different protocols can be read. However, this is inefficient and expensive, as multiple readers would not be required if a single common standard for tags were used. Furthermore, multiple readers are likely to interfere with each other, especially if they operate at common radio frequencies.

Prior art readers for radio frequency identification systems have been devised to address some of the above-mentioned problems. For example, International patent application No. PCT/US98/10136, filed by AVID Identification Systems, Inc., on 14 May 1998, and entitled READER FOR RFID SYSTEM discloses a reader for reading tags of different protocols in a radio frequency identification system. According to this system, the identification signal from the tag is sensed by the inductive coil of the reader as described above in that the voltage across the coil is modulated in accordance with the code sequence programmed into the tag. The signal received by the coil is sent to a central processing unit for processing and decoding, where the signal is first analyzed by measuring the pulse width of the signal. The central processing unit then selects a tag protocol that is most likely to be the correct protocol based on the pulse width that has been measured.

The AVID radio frequency identification system may suffer from a number of shortcomings. For example, while the radio frequency identification system provides for reading of tags using different protocols in the same frequency range, it does not permit tags operating at different frequencies to be read by the same reader as the inductive coil of the reader is not operable for all electromagnetic frequencies. The AVID system is essentially an inductive based arrangement operating at a single frequency. Furthermore, the AVID system does not accommodate all of the tag properties and characteristics described above. Because the AVID system measures a single pulse width, at worst the system can only infer data rate from the pulse width and at best the system can only select from a very small group of tag types where the tag type would only be suitable if it has a distinguishing header pulse width. In general, the AVID system is not suitable for multiple carrier frequencies.

In view of the foregoing, there still remains a reader for a radio frequency identification system that may be used with tags operating at different frequencies with different protocols.

SUMMARY OF THE INVENTION

The present invention provides a reader/interrogator for a radio frequency identification system which is suitable for use with tags operating at different frequencies and also with different tag operating properties such as data protocol, encoding, data rates, and functionality as introduced above.

The reader/interrogator system according to the invention divides the problem of multiple tag types into two classes. The first class is characterized by carrier frequency and the second class is characterized by the tag operating parameters. The first class may be broadly broken down into four principal frequency bands that are in common use today. Each of these bands, on its own, requires its own antenna configuration, transmitter and receiver appropriate to the frequency of operation. This frequency dependent component is referred to as an RFM or radio frequency module.

The second class is defined as the remaining tag operating parameters, sometimes grouped together and referred to as protocol, and are considered as computational problems. This is handled by another component of the invention referred to as the ICM or interrogator control module. This module either directly calculates the parameters from the incoming tag signal, such as data rate, message length and encoding scheme or exhaustively tries either in parallel or serial the possible remaining parameters, such as type of CRC used. The results of the parameter determinations are verified against a list of acceptable tag parameter combinations before passing on the decoded data as a valid message.

The reader/interrogator according to the invention simultaneously handles tags operating at different carrier frequencies by utilizing a separate RFM for each required carrier frequency connected to an ICM. The data being passed between the RFM and ICM is stripped of any carrier frequencies and is processed by the ICM in a like manner regardless of which frequency band the tag is operating in. The carrier frequency or RFM from which the tag data is received is only used as one of many parameters to specify a tag type from the list of valid tag type parameter combinations.

In addition, multiple RFMs operating at the same carrier frequency may be used with a single ICM where the application requires a special shaping of the field or multiple antenna orientations or polarizations in order to read all the tag configurations. In this case the single ICM removes any problems of interference that would arise from having two separate reader/interrogators trying to handle the collision arbitration and commands to a tag that might be picked up by both units simultaneously. It also prevents having the strong signal from one reader/interrogator totally wiping out any low level return signal from a tag which would otherwise only be visible to another reader/interrogator.

In accordance with one aspect of the present invention, there is provided an interrogator for a radio identification system having a number of tags, with selected tags operating at a first frequency, and other tags operating at another frequency, the interrogator comprises: (a) a first radio frequency module having a transmitter for transmitting an output signal at the first frequency to the tags, and including a receiver for receiving return signals transmitted by the tags operating at the first frequency; (b) a second radio frequency module having a transmitter for transmitting an output signal at the second frequency to the tags, and including a receiver for receiving return signals transmitted by the tags operating at the second frequency; (c) a controller module coupled to the first and second radio frequency modules, the controller module including a controlling for controlling the transmitters for transmitting the output signals to the tags, and including a decoder for decoding the return signals received from the tags.

BRIEF DESCRIPTION OF THE DRAWINGS

Reference will now be made, by way of example, to the accompanying drawings, which show a preferred embodiment of the present invention, and in which:

FIG. 2 is a block diagram showing a conventional tag suitable for use with the reader according to the present invention;

FIG. 3(a) is a block diagram showing a reader frequency module for the reader according to the present invention;

FIG. 3(b) is a block diagram showing an interrogator control module for the RFID reader according to the present invention;

FIG. 4(a) is a schematic diagram showing in more detail the front-end of the reader frequency module of FIG. 3(a); and FIG. 4(b) is a schematic diagram showing in more detail the rear-end of the reader frequency module of FIG. 3(a).

DETAILED DESCRIPTION OF THE PREFERRED EMBODIMENT

Figure 1:
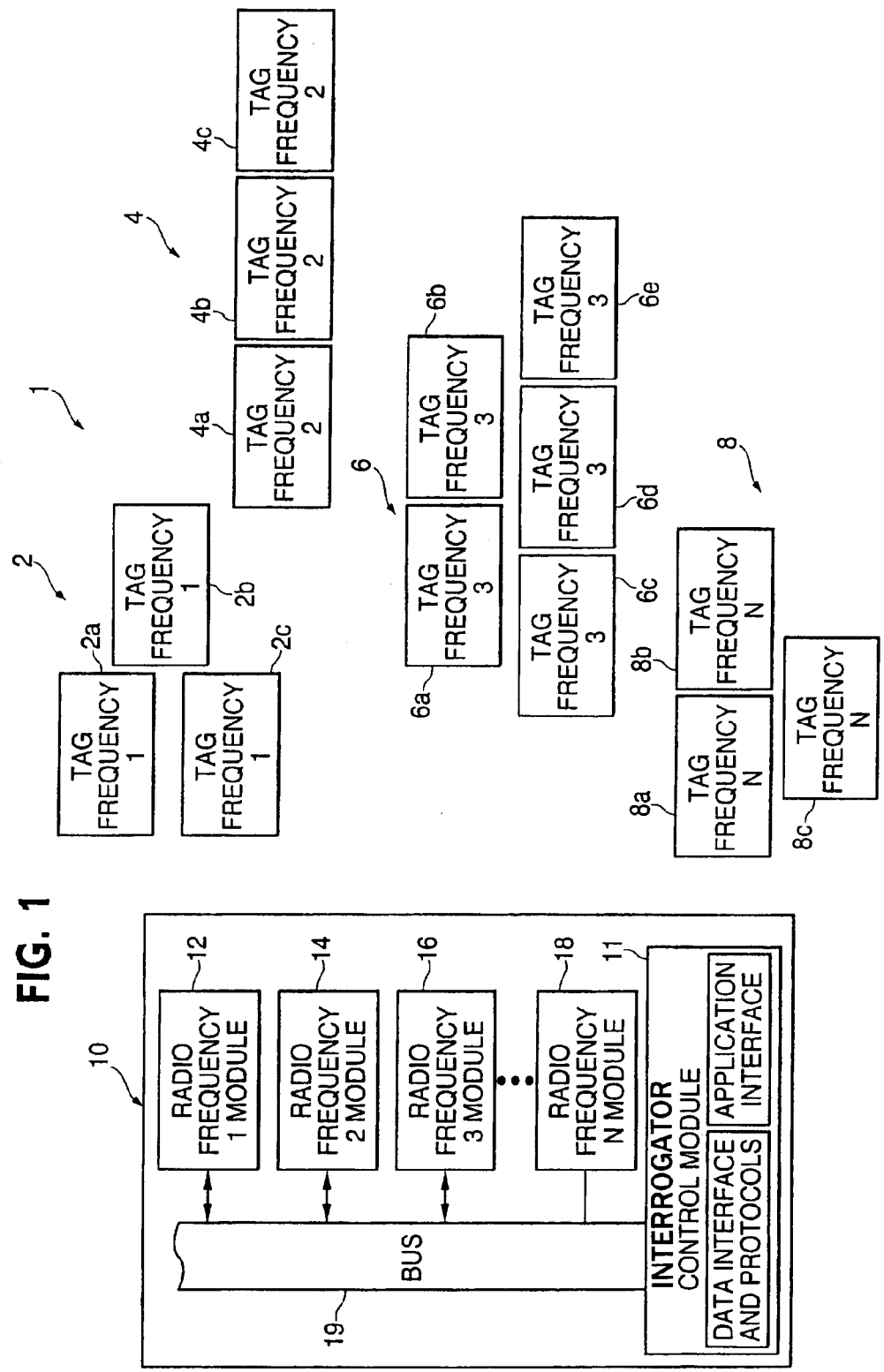
FIG. 1 is a block diagram showing a reader according to the present invention for a radio frequency identification system.

Reference is first made to FIG. 1 which shows a multiple-frequency/protocol RFID tag reader according to the present invention and indicated generally by reference 10. The multiple-frequency/protocol RFID tag reader 10 provides the interrogator in a radio frequency identification ("ID") system 1. As shown in FIG. 1, the radio frequency identification system or RFID 1 comprises a plurality of tags. In conventional RFID systems the tags in the field for a reader all operate at the same frequency with the same tag parameters. As will be described, the reader 1 according to the present invention is suitable for interrogating tags operating at different frequencies in the radio frequency field.

The reader or interrogator 10 as shown in FIG. 1 is operable with four different frequency types of tags 2, 4, 6 and 8. The first type of tags 2, shown individually as 2a, 2b and 2c, operate at a first frequency, for example, 125 KHz. The second type of tags 4, shown individually as 4a, 4b, and 4c, operate at a second frequency, for example, 13.56 MHz. The third type of tags 6, shown individually as 6a, 6b, 6c, 6d and 6e, operate at a third frequency, for example, 869 MHz. The fourth type of tags 8, shown individually as 8a, 8b and 8c, operate at a fourth frequency, for example, 2.45 GHz. It will be appreciated that while the reader 10 according to the present invention is described in the context of four types of tags, the reader 10 is suitable for operation with tags operating at other frequencies and with differing operating parameters whether at the same or different frequency.

In the industry, radio frequency identification tags generally come in four different frequency bands, 100–200 KHz., 13.56 MHz., 450-869-917 MHz. and 2.45 GHz. As will be understood, all four bands have different physical properties which make the tags suitable for specific applications and environments.

The first frequency band, i.e. 100–200 KHz., is suitable for tagging containers holding liquids and also for tagging the human body. These radio frequency fields can be well defined and well contained. The first frequency band, however, is suitable only for short ranges, typically less than one meter. Moreover, the first frequency band is only capable of very low data rates and therefore provides poor performance in applications requiring multiple tags to be read in the radio frequency field at the same time.

The second frequency band, i.e. 13.56 MHz., is commonly used for short range passive tags. It is generally inductively coupled in the tag since the wavelength is too long for a practical far field antenna. Like the first band, the range is relatively short, approximately one meter. This frequency band is also sensitive to the presence of water and de-tuned by the human body.

The third band, i.e. 458-869-917 MHz., is commonly used for long passive tags (e.g. half-duplex tags). The wavelength in this band is short enough to use dipole antennas and far field effects. This band is suitable for long range tag applications, e.g. one-half watt of power provides an approximate range of 10 to 15 feet. This band also supports high data rates and with anti-collision algorithms in the reader, numerous tags can be supported at the same time. However, spacers or special antennas must be utilized to tag metal objects, and these tags are not suitable for tagging people or containers of liquid.

The fourth band, i.e. 2.45 GHZ., can support very high data rates and is therefore suitable for multiple tags operating in the radio frequency field. Also with the high frequency, only a very small antenna geometry is needed which results in a small footprint for the tag. When compared to the other frequency bands, tags for this band are the most sensitive to water and people. Another disadvantage is that these type of tags tend to utilize expensive components in order to provide efficient field operation.

Reference is made back to FIG. 1. To provide the capability to operate with different types of tags 2, 4, 6 or 8, the reader 10 according to the present invention comprises an interrogator control module 11, and a radio frequency module for each different frequency of tag. Differing types of tags, which have the same carrier frequency, may use the same radio frequency module. As shown in FIG. 1, the reader 10 includes a radio frequency module 12 for reading the tags 2 operating at the first frequency (e.g. 125 KHz.), a radio frequency module 14 for reading the tags 4 operating at the second frequency, a radio frequency module 16 for reading the tags 6 operating at the second frequency (e.g. 13.56 MHz.), a radio frequency module 16 for reading tags 6 operating at the third frequency (e.g. 869 MHz.), and a radio frequency module 18 for reading tags 8 operating at the fourth frequency (e.g. 2.45 GHZ.). The radio frequency modules 12, 14, 16, 18 provide the radio interfaces between the respective tag types and the interrogator control module 11.

As shown in FIG. 1, the radio frequency modules 12, 14, 16, 18 are coupled to the interrogator control module 11 through a bus 19. The bus 19 is implemented as a low speed bus and provides control signals to the radio frequency modules 12 to 18 for interrogating the respective types of tags 2 to 8 and data signal for receiving information transmitted by the tags to the respective radio frequency modules. By utilizing such an arrangement, the radio frequency modules are arranged in parallel to provide a multi-frequency capability for the reader 10, which is further adaptable by adding additional radio frequency modules or replacing one or more of the existing radio frequency modules 12, 14, 16 or 18 with radio frequency modules configured for other frequency bands. In addition, a plurality of radio frequency modules may be used at the same frequency band where that might be required for shaping of the field or for handling different tag orientations being presented in the field. It will be appreciated that if multiple radio frequency modules are being used in the same frequency band, they should differ in the center frequency sufficient to meet regulations and such that the beat frequency between the two units is higher than the maximum data rate.

Reference is next made to FIG. 2, which shows in diagrammatic form the organization of a typical tag 20 according to the art. The tag 20 comprises a series of modules including an air interface 21, logic 22, a power supply 24. If the tag 20 is a read/write tag, there is memory module 26. The air interface 21 provides a radio frequency communication interface to the reader 10. The logic 22 comprises conventional logic (i.e. digital circuitry) that controls the other modules in the tag 20. The power supply 24 provides local power to run the tag 20. In the majority of tags, i.e. passive tags, the power supply 24 is energized by the RF signal received from the reader 10. In active tags the power supply circuit comprises a battery and an activation circuit. If the tag 20 is read/writeable, then user defined data may be stored in this memory and read back by the reader. Depending on the tag properties, a particular tag might be a write once device or it might be erasable and rewritten many times (typically 10,000). Some tags may only be write-able via direct contact and not through the RF interface, however, the reader provides the capability to write the tags via the RF interface.

Referring next to FIGS. 3(a) and 3(b), the radio frequency module 12 and the interrogator control module 11, respectively, are shown in more detail. Fig. 3(a) also includes tag(s) 2, 4, 6 or 8. According to this aspect of the present invention, the radio frequency module 12 provides the radio interface to the associated types of tag (s) 2, 4, 6 or 8. The radio frequency module 12 is a frequency dependent device, e.g. 100–200 KHz., 13.56 MHz, 458-869-917 MHz. or 2.45 GHz. The radio frequency module 12 and the tag(s) go together as one type of unit (indicated as 13 in FIG. 3 (a), i.e. any given tag frequency will have a dedicated radio frequency module 12 in the reader 10. As shown in FIG. 3(a), the radio frequency module 12 comprises an air interface stage 31 and a data interface stage 32. Both the air interface stage 31 and the data interface stage 32 comprise analogue circuitry as will be described in more detail below with reference to FIG. 4(a) and 4(b). The data interface stage 32 provides a data shaping function.

The interrogator control module 11 as described above connects to and controls several types of radio frequency modules 12, 14, 16 and 18 and tag types through the bus 19 (FIG. 1). This arrangement according to the present invention allows the reader 10 to read tags in the same field which operate at different frequencies and/or different operating parameters. As shown in FIG. 3(b), the interrogator control module 11 comprises a data interface and protocols stage 34, and an application interface stage 36.

The application interface stage 36 comprises a programmed microprocessor which interfaces to the data interface and protocols stage 34 and controls the operation of the interrogator control module 11 and the individual radio frequency modules 12, 14, 16 and 18 through the bus 19. As shown in FIG. 3(b), the interrogator control module 11 also includes a LCD touch panel 38 for accepting user commands and displaying information concerning the operation of the radio frequency identification system 1, the radio frequency modules 12, 14, 16 and 18, and the tag types. Preferably, the program memory for the microprocessor in the application interface 36 is implemented using flash memory thereby allowing programs to be downloaded from a PC (not shown) via a conventional network connection.

The data interface and protocols stage 34 includes circuitry for processing the receive signal output from the data interface stage 32 (FIG. 3(a)) in the radio frequency modules 12 (14, 16 and 18). This processing includes performing clock separation, recovering data from the receive signal output, and the handling of data protocols based the tag types being controlled. The data interface and protocols stage 34 is preferably implemented as a field programmable gate array or FPGA. Advantageously, an implementation utilizing a field programmable logic device allows the reloading of different protocols under the control of the microprocessor in the application interface 36. The FPLD is programmed to accept the data rates and protocols available on the various types of tags 2, 4, 6 or 8. In operation, the microprocessor in the interrogator control module 11 loads the FPGA with the appropriate configuration data to handle data decoding and protocol conversion for the tags which are to be interrogated in the field. At this point the data is totally stripped of its carrier frequency component and other than being used as an index into a list of acceptable tag types with their possible operating parameters, the carrier frequency is no longer used in the decoding. There are tag families which use the same logic circuit and therefore operating parameters regardless of the carrier frequency. In this case the data interface and protocol stage use the same procedure for decoding regardless of which RFM the signal came in on. In some cases there will be different tag types operating on the same carrier frequency and the interface and protocol stage will use different procedures even for signals coming in on the same RFM.

The FPGA directly controls the transmitter for data going back to the tag or for collision arbitration signals going to the tags, since the FPGA has derived the clock rate and timing required for the particular tag type. The RFM and the microprocessor may also gate these signals to have general control of the RFM's transmitter. The ICM turns on the transmitters according to regulatory and application requirements to power the passive tags and/or to wake up the active tags and any polling sequence that may be required for the tags types in use is transmitted. The ICM then waits for the response signals from the tags and determines the type of tag that is in the field. The FPGA directly calculates a selected parameter from the incoming tag signal, such as data rate, message length and encoding scheme or exhaustively tries either in parallel or serial the possible remaining parameters, such as type of CRC used. The results of the parameter determinations are verified against a list of acceptable tag parameter combinations before passing on the decoded data as a valid message.

The FPGA is configured to handle all low level communications to and from the tag via the air interface stage 31 and the data interface stage 32 in the radio frequency module 14. While the FPGA is programmed to handle the low level communication, the microprocessor is programmed to perform all higher level data protocol conversions and the forwarding of processed data to the user (i.e. via a LCD touch panel) or to a networked PC using a standard communication protocol such as TCP/IP.

Preferably, the handling of data rate and data encoding for the tags in the reader 10 is implemented as a clock and data separation scheme utilizing a phase locked loop on the incoming signal. This implementation is advantageous since the tag rate can and will vary during transmission and therefore measuring a single pulse is generally not sufficient to yield an accurate bit rate for the tag data. This yields a far better result than just measuring the width of the leading pulse in the message.

It will be understood that while accurately determining the data rate of the tag message may be sufficient to distinguish between the tag types on the basis of different data rates, in general, this is not sufficient to determine other operating parameters of the tag.

The data and clock separation function in the FPGA presents the data to the protocol and error checking function of the FPGA. Preferably the FPGA is implemented to provide several protocols and CRC checks in parallel. The path leading to a full check, or zero errors in decoding is assumed to be the correct operating parameters for that tag. The tag message along with the assumed tag type is presented to the microprocessor which then determines if the type is in the list of acceptable tag types. If so the tag data is passed on to the application.

Reference is next made to FIGS. 4(a) and 4(b) which show in more detail the air interface stage 31 and the data interface 32, respectively, for a radio frequency module 12, 14, 16 and 18. In particular the figures depict a far field effect type of RFM which uses an RF antenna as opposed to a coil with inductive coupling. This type of RFM is suitable for the high frequencies such as UHF or higher. As shown in FIG. 4(a), the air interface stage 31 comprises an antenna 101, a circulator 102, a transmitter 104, a mixer stage 106, and an amplifier stage 108. Preferably, the mixer stage 106 and amplifier stage 108 comprise a minimum of two channels with a delay between them to allow for quadrature decoding of the signal. Additional channels and delays could be added to allow the same RFM to be used at different frequencies. FIG. 4(a) shows three channels, which could allow for quadrature decoding of up to three separate carrier frequencies. Each channel having a corresponding mixer 107, shown individually as 107a, 107b and 107c, and a corresponding amplifier 109, shown individually as 109a, 109b, and 109c. As will be understood by those skilled in the art, the three channel configuration allows quadrature information to be extracted for each tag. The transmitter 104 is coupled to the antenna 101 through the circulator 102. In known manner, the circulator 102 allows the antenna 101 to be used for both transmitting signals to the tags 2 (4, 6, and 8) and receiving signals from the tags 2 (4, 6, and 8). The transmitter 104 generates a constant field (i.e. the illumination or power signal) which provides power to each of the tags 2 associated with the radio frequency module 12. The transmitter 104 also generates a reference output signal that is fed to the mixer for each of the channels as shown in FIG. 4(a). The mixer 107b for the second channel includes a delay element 105a to delay the feed of the reference output signal. Similarly, the mixer 107c for the third channel includes a delay element 105b to further delay the feed of the reference output signal (received from the first delay element 105a).

The mixer subtracts the carrier to produce a Non Return to Zero image of the data that was modulated onto the carrier by the tag. The signal from the mixer is AC coupled to the amplifier stage to remove any DC component that might be contained in the signal. This allows for higher gains on the amplifiers. The signal is then further differentiated to provide sharp pulses on the leading and trailing edges of the data bits. Advantageously, this allows for even higher amplification stages and eliminates the need for filtering between stages according to the data rate, thus making the channel suitable for a wide range of data rates. The data interface stage 32 receives the output from the amplifier stage 108 (i.e. the amplifier 109 for each of the three channels) in the air interface stage 31. The data interface stage 32 provides a pulse shaping operation and comprises a pulse shaping circuit 110 as shown in FIG. 4(b) for each of the three channels in the air interface stage 31 (FIG. 4(a)). The pulse shaping circuit 110 comprises a discriminator 111, a rectifier circuit 112, a summing amplifier 114, a logic level convertor 116 and a output port 118. The discriminator 111 comprises a capacitor which couples the output from the amplifier 109a to the rectifier circuit 112. The discriminator 111 converts the output signal into pulses with defined edges. The rectifier circuit 112 comprises a pair of diodes which separate the pulses into positive and negative edges. The positive and negative edges are then summed together by the operational amplifier 114 resulting in a pulse for each edge. The logic level convertor converts the level of the pulses for output. The output port 118 to the bus 19 (FIG. 1) is implemented using an opto-coupler device which advantageously provides isolation and level conversion between the circuitry in the radio frequency module 12 (14, 16 or 18) and the interrogator control module 11. The pulses are then processed by a data protocol decoder in the data interface and protocols stage 34 of the interrogator control module 11.

The data decoder is implemented in the program (i.e. firmware) executed by the microprocessor in the data interface and protocols stage 34. The data decoder provides the functionality to decode the pulse streams received from the data interface stage 32 in the radio frequency module 12 (14, 16 and 18). Utilizing the phase locked loop clock and data separation scheme, the pulse stream is decoded according to the protocol (e.g. Manchester encoded) associated with the type of tag 2, 4, 6 or 8. The three output data channels in each radio frequency module 12, 14, 16 and 18 provide parallel paths for the decoding the data received from the tags. The programmed microprocessor performs code checking and CRC decoding to select the tag data stream which does not have any code violations and a successful CRC result.

In operation, the interrogator control module 11 initiates the interrogation of the tags through the radio frequency module configured for the frequency band of the tags, for example, the second radio frequency module 14 (FIG. 1) is configured for the 13.56 MHz tags 4. The interrogation can be in response to an input from the user entered on the LCD touch panel 38 or to a command received from a networked PC. The interrogator control module 11 sends a command (i.e. control signals) via the bus 19 to the radio frequency module configured for the tags being interrogated, for example, the radio frequency module 14 for 13.56 MHz tags 4. In the radio frequency module 14, the transmitter 104 (FIG. 4(a)) excites the antenna 101 to transmit an interrogation or power signal to the tags 4 in the field. At the same time, the transmitter 104 also generates a reference output signal for the mixer stage 106 (FIG. 4(a)) as described above. The tags 4 tuned to the frequency of the radio frequency module 14 receive and are energized by the interrogation signal and after a short delay transmit their response signals back to the radio frequency module 14. The response signals are received by the antenna 101 and reflected back and split into three channels for the mixer stage 106 through the circulator 102. In the mixer stage 106, the received signal is subtracted from the transmitted signal to produce a phase shift. The output from the mixer stage 106 is passed to the amplifier stage 108. The amplified signal is then shaped by the pulse shaping circuit 110 (as described above with reference to FIG. 4(b)) to generate a series of pulses in three channels. The three channels of pulses are transferred over the bus 19 to the data interface and protocols stage 34 of the interrogator control module 11. In the interrogator control module 11, the data decoder (data interface and protocols stage 34) uses a phase locked loop clock and data separation scheme to lock onto the pulse stream, determine the protocol for the tag, and extract the data transmitted by the tag. Code checking and application of CRC is also performed to ensure the integrity of the data decoding.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. An interrogator for a radio identification system having a plurality of tags, the plurality of tags including a first subset of tags operating only within a first frequency band, the plurality of tags including a second subset of tags operating only within a second frequency band, the first subset of tags excluding each tag from the second subset of tags, said interrogator comprising:
   (a) a first radio frequency module having a transmitter configured to transmit an output signal at a first frequency to the first subset of tags, the first radio frequency module including a receiver configured to receive return signals transmitted by the first subset of tags operating at the first frequency, the first frequency being within the first frequency band, the transmitter and the receiver of the first radio frequency module being operable over the first frequency band, the first frequency band including a plurality of frequencies each being outside the second frequency band;
   (b) a second radio frequency module having a transmitter configured to transmit an output signal at a second frequency to the second subset of tags, the second radio frequency module having a receiver configured to receive return signals transmitted by the second subset of tags operating at the second frequency, the transmitter and the receiver of the second radio frequency module being operable over the second frequency band, the second frequency band including a plurality of frequencies each being outside the first frequency band;
   (c) a controller module coupled to said first and second radio frequency modules, said controller module including a controller configured to control the transmitter associated with the first frequency and the transmitter associated with the second frequency, the controller module including a decoder configured to decode return signals received from said tags.

2. The interrogator of claim 1, wherein the decoder includes a signal divider configured to divide the return signals into multiple channels and a converter configured to produce pulses based on the return signals.

3. The interrogator of claim 2, wherein the decoder includes a synchronizer configured to synchronize a frequency of the pulses and an extracter module configured to extract information from the pulses according to a protocol associated with the tag transmitting the return signal.

4. The interrogator of claim 3, wherein the decoder further includes a code checker associated with the pulses and selector configured to select the channel without code violations.

5. The interrogator of claim 2, wherein each transmitter includes an antenna configured to transmit its output signal in response to a control signal from the controller.

6. The interrogator of claim 5, wherein the divider includes a circulator having an input port coupled to the antenna and an output port for each of the channels.

7. The interrogator of claim 6, wherein the divider includes a mixer and an amplifier for each of the channels, each of the mixers having an input coupled to the respective output port of the circulator and an output coupled to the respective amplifier for the channel, the output of each amplifier is coupled to a converter configured to convert the return signals into pulses for the channel.

8. The interrogator of claim 7, wherein the converter includes a pulse shaping circuit for each of the channels.

9. The interrogator of claim 8, wherein the pulse shaping circuit includes an isolated output port coupled to a bus connected to the controller.

10. The interrogator of claim 1, wherein the first radio frequency module and the second radio frequency module are coupled to the controller through a bus.

11. The interrogator of claim 10, wherein the plurality of tags including a third subset of tags operating only within a third frequency band, the third subset of tags excluding each tag from the first subset of tags and each tag from the second subset of tags, the third frequency band having a plurality of frequencies each being outside the first frequency band and the second frequency band,
   the interrogator further comprising:
   a third radio frequency module having a transmitter configured to transmit an output signal at the third frequency to the tags, the third radio frequency module having a receiver configured to receive return signals transmitted by tags operating at the third frequency.

12. The interrogator of claim 11, the plurality of tags including a fourth subset of tags operating only within a fourth frequency band excluding each tag from the first subset of tags, each tag from the second subset of tags and each tag from the third subset of tags, the fourth frequency band having a plurality of frequencies each being outside the first frequency band, the second frequency band and the third frequency band,
   the interrogator further comprising:
   a fourth radio frequency module having a transmitter configured to transmit an output signal at the fourth frequency to the tags, and including a receiver configured to receive return signals transmitted by tags operating at the fourth frequency.

13. The interrogator of claim 12, wherein the first frequency falls in a range 100 to 200 KHz.

14. The interrogator of claim 13, wherein the second frequency is substantially 13.56 MHz.

15. The interrogator of claim 14, wherein the third frequency falls in a range 458 to 917 MHz.

16. The interrogator of claim 15, wherein the fourth frequency is substantially 2.45 GHz.

17. A radio identification interrogator, comprising:
a first radio frequency (RF) module being associated with its own frequency band and having a transmitter and a receiver, the transmitter of the first RF module being configured to send an output signal having a carrier frequency within the frequency band associated with the first RF module, the receiver of the first RF module configured to receive a return signal based on the output signal associated with the transmitter of the first RF module and being associated with a tag from a first plurality of tags, the first RF module is configured to receive a return signal modulated according to a first protocol from a plurality of protocols; and
a second RF module being associated with its own frequency band different from the frequency band associated with the first RF module, the second RF module having a transmitter and a receiver, the transmitter of the second RF module being configured to send an output signal having a carrier frequency within the frequency band associated with second RF module, the receiver of the second RF module configured to receive a return signal based on the output signal associated with the transmitter of the second RF module and being associated with a tag from a second plurality of tags, the first plurality tags excluding each tag from the second plurality of tags, the second RF module is configured to receive a return signal modulated according to a second protocol from a plurality of protocols.

18. The radio identification interrogator of claim 17, further comprising:
a controller coupled to the transmitter of the first RF module and the transmitter of the second RF module; and
a decoder coupled to the receiver of the first RF module and the receiver of the second RF module.

19. The radio identification interrogator of claim 17, further comprising:
a decoder coupled to the receiver of the first RF module and the receiver of the second RF module, the decoder having a first output channel associated with the first protocol and the second output channel associated with the second protocol.

20. A method, comprising:
sending a signal having a carrier frequency within a first frequency band;
sending a signal having a carrier frequency within a second frequency band mutually exclusive from the first frequency band;
receiving, from a second tag operative only within the second frequency band, a return signal based on the signal having the carrier frequency within the first frequency band, the return signal associated with the first tag being within the first frequency band and outside the second frequency band; and
receiving, from a second tag operative only within the second frequency band, a return signal based on the signal having the carrier frequency within the second frequency band, the return signal associated with the second tag being within the second frequency band and outside the first frequency band.

21. The method of claim 20, wherein:
the return signal associated with the first frequency band is modulated according to a first protocol from a plurality of protocols; and
the return signal associated with the second frequency band is modulated according to a second protocol from a plurality of protocols.

22. The method of claim 20, wherein the carrier frequency within the first frequency band is between 100 to 200 KHz.

23. The method of claim 20, wherein the carrier frequency within the second frequency is substantially 13.56 MHz.

24. The method of claim 20, further comprising:
sending a signal having a carrier frequency within a third frequency band, the third frequency band being mutually exclusive from the first frequency band and the second frequency band; and
receiving, from a third tag operative only within a third frequency band, a return signal based on the signal having the carrier frequency within the third frequency band, the return signal associated with the third frequency band being associated with the third tag, not the first tag and not the second tag,
the carrier frequency within the third frequency band being between 458 to 917 MHz.

25. The method of claim 24, further comprising:
sending a signal having a carrier frequency within a fourth frequency band, the fourth frequency band being mutually exclusive from the first frequency band, the second frequency band and the third frequency band; and
receiving, from a fourth tag operative only within a fourth frequency band, a return signal based on the signal having the carrier frequency within the fourth frequency band, the return signal associated with the fourth frequency band being associated with the forth tag, not the third tag, not the second tag and not the first tag, the carrier frequency within the fourth frequency band being substantially 2.45 GHz.

26. A radio identification interrogator, comprising:
a first radio frequency (RF) module being associated with its own frequency band and having a transmitter and a receiver, the transmitter of the first RF module being configured to send an output signal having a carrier frequency within the frequency band associated with the first RF module, the receiver of the first RF module configured to receive a return signal within the frequency band associated with the first RF module and based on the output signal associated with the transmitter of the first RF module, the return signal associated with the first RF module being associated with a tag from a first plurality of tags; and
a second RF module being associated with its own frequency band mutually exclusive from the frequency band associated with the first RF module, the second RF module having a transmitter and a receiver, the transmitter of the second RF module being configured to send an output signal having a carrier frequency within the frequency band associated with second RF module, the receiver of the second RF module configured to receive a return signal within the frequency band associated with second RF module based on the output signal associated with the transmitter of the second RF module, the return signal associated with the second RF module being associated with a tag from a second plurality of tags, the first plurality tags excluding each tag from the second plurality of tags,
the first frequency band including a plurality of frequencies each being outside the second frequency band, the second frequency band including a plurality of frequencies each being outside the first frequency band.

* * * * *